US006792258B1

(12) United States Patent
Nokes et al.

(10) Patent No.: US 6,792,258 B1
(45) Date of Patent: Sep. 14, 2004

(54) DIVERSITY RECEPTION METHOD AND DIVERSITY RECEIVERS

(75) Inventors: Christopher Ryan Nokes, Tadworth (GB); Oliver Paul Haffenden, Tadworth (GB); Jonathan Highton Stott, Tadworth (GB); Peter Neil Moss, Tadworth (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 09/550,733

(22) Filed: Apr. 17, 2000

(30) Foreign Application Priority Data

Apr. 15, 1999 (GB) ............................................. 9908675

(51) Int. Cl.[7] ................................................. H04B 1/06
(52) U.S. Cl. ..................... 455/277.2; 455/135; 455/273; 375/347
(58) Field of Search ................................. 455/134, 135, 455/63, 562, 132, 133, 136, 137, 138, 139, 272, 277.1, 277.2, 63.1, 63.3, 63.4, 273; 375/347; 342/359, 361, 362

(56) References Cited

U.S. PATENT DOCUMENTS

| 5,345,600 A | | 9/1994 | Davidson |
| 5,903,826 A | * | 5/1999 | Nowak ........................ 342/367 |
| 6,141,392 A | * | 10/2000 | Hoshikuki et al. .......... 375/347 |

FOREIGN PATENT DOCUMENTS

| EP | 766 414 A1 | 4/1997 |
| GB | 2257605 A | 1/1993 |
| GB | 2292293 A | 2/1996 |

OTHER PUBLICATIONS

U.S. Ser. No. 09/545,611, filed Apr. 7, 2000 for Improvements Relating to OFDM Receivers.
U.S. Ser. No. 09/550,433, filed Apr. 17, 2000 for Diversity Reception Method and Diversity Receivers Used with OFDM Signals.
Bulumulla, Selaka B. et al, "An Adaptive Diversity Receiver for OFDM in Fading Channels", IEEE, Sep. 1998, pp. 1325–1329.
Tong, Fangwei et al, "A Switching CMA/Diversity Antenna for Canceling Echoes with Fading in an FM Broadcasting Receiver", IEEE, May 1996, pp. 272–276.

* cited by examiner

*Primary Examiner*—Jean Gelin
(74) *Attorney, Agent, or Firm*—Wolf, Greenfield & Sacks, P.C.

(57) ABSTRACT

A diversity receiver for receiving digital signals has a soft-decision decoder in each of its receiving sections, to provide confidence values for the received decoded digital values, and combines the values from the receiving sections in dependence upon the confidence values. The receiver is especially suitable for use with COFDM, and has two sections, the outputs of which are applied to a soft-decision combiner which combines the signals in dependence upon confidence values received from the demodulators. The output is then applied to a Viterbi decoder. The combining can simply involve switching but preferably involves averaging. Synchronisation and squelching can be provided. The system can be used with frequency diversity, spatial or polarisation diversity, or with antenna pattern diversity, in which case it can constitute an automatic rotator. The system automatically switches between different types of diversity reception, e.g. frequency and spatial diversity, in dependence upon the received signal quality.

10 Claims, 2 Drawing Sheets

DIVERSITY RECEPTION METHOD AND DIVERSITY RECEIVERS

BACKGROUND OF THE INVENTION

This invention relates to a method of diversity reception of transmitted radio-frequency signals and to receivers for use in the method.

Diversity reception is a technique that has often been used, particularly for mobile reception of signals. Typically, it involves two (or more) receiving antennas, and some signal processing to combine the received signals. The two antennas are generally located so that they can receive different versions of the same transmitted signals. This may be done for example by placing them a short distance apart (antenna spatial diversity), or by using antennas with different polarisation (antenna polarisation diversity) or radiation pattern (antenna pattern diversity). Frequency diversity is also known in which the signal is transmitted on two frequencies; in this case a single antenna may suffice connected to two tuners.

U.S. Pat. No. 5,345,600 describes a time and frequency diversity system which uses re-transmission of signals in poor signal conditions and requires transmission from the 'receiver' back to the 'transmitter'. European Patent Application EP-A-766 414 describes another transceiver using space and polarisation diversity, the manner of operation not being specified.

Strictly speaking, if the signal paths are such that only one of the antennas is capable of receiving a signal at any one time, then this is not a diversity system, but a system with extended coverage capabilities. However, such a system is regarded as being a diversity system within the meaning of the term as used in this specification. In any event, in practice it is likely that local reflections will always ensure that both antennas receive some signals.

SUMMARY OF THE INVENTION

The invention in its various aspects is defined in the independent claims below to which reference should now be made. Advantageous features are set forth in the appendant claims.

A preferred embodiment of the invention is described in more detail below with reference to the drawings. In this embodiment, designed in the context of broadcast COFDM signals, a diversity receiver for receiving digital signals has a soft-decision decoder in each of its receiving sections, to provide confidence values for the received decoded digital values, and combines the values from the receiving sections in dependence upon the confidence values. The receiver has two sections the outputs of which are applied to a soft-decision combiner which combines the signals in dependence upon confidence values received from the tuner/demodulators. The output is then applied to a Viterbi decoder. The combining can simply involve switching but preferably involves averaging. Synchronisation and squelching can be provided. The system can be used with frequency diversity, spatial or polarisation diversity, or with antenna pattern diversity, in which case it can constitute an automatic rotator. The system automatically selects from all possible diversity sources the two sources which provide the best quality signals.

BRIEF DESCRIPTION OF THE DRAWINGS

The invention will now be described in more detail, by way of example, with reference to the accompanying drawings, in which.

DETAILED DESCRIPTION OF THE PREFERRED EMBODIMENTS OF THE INVENTION

Figure 1:
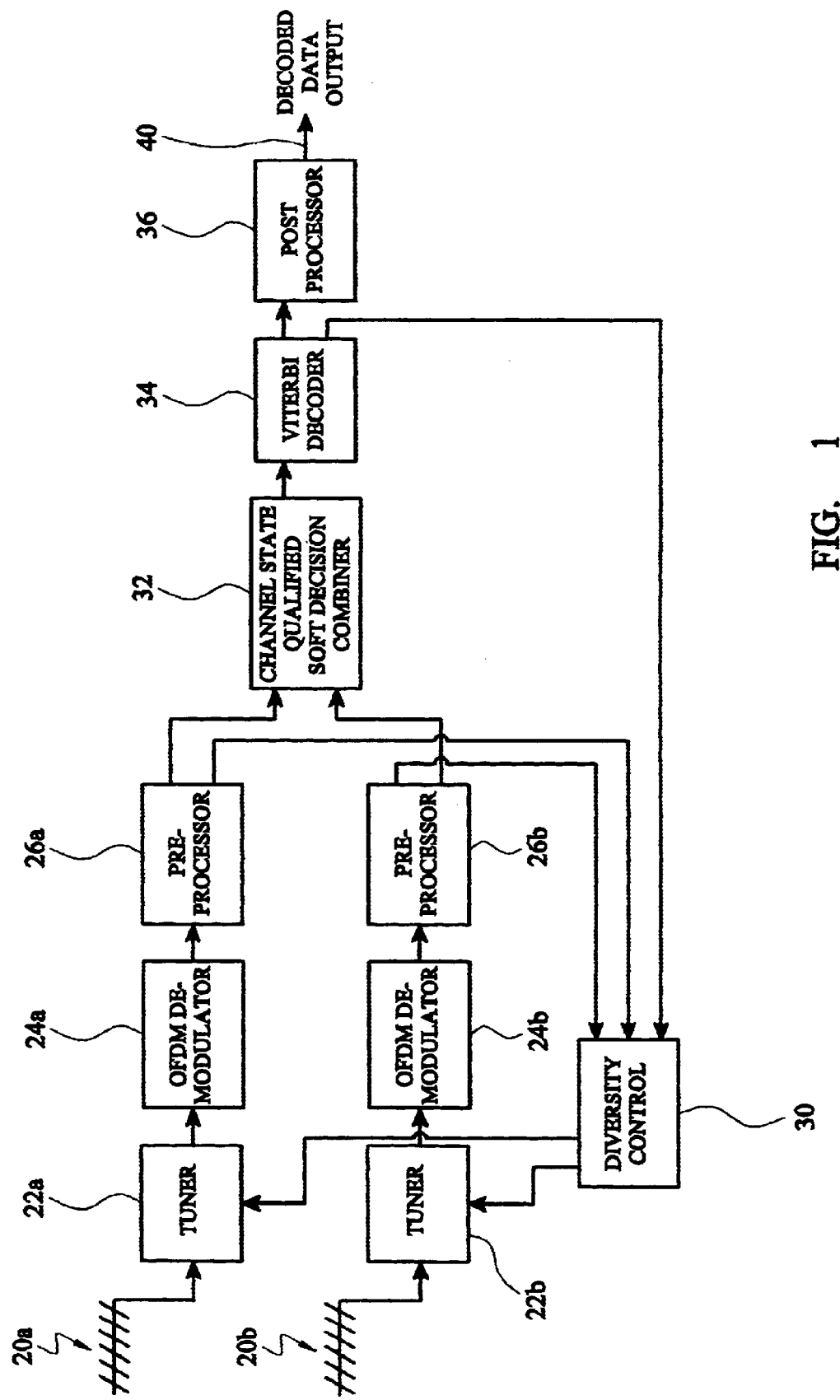
FIG. 1 is a block schematic diagram of a diversity receiver for COFDM signals in accordance with this invention.

A system called Coded Orthogonal Frequency Division Multiplexing (COFDM) has been developed for Digital Audio Broadcasting (DAB) and Digital Terrestrial Television (known as DVB-T). The bits of each digital sample are distributed over a number of carriers at a number of different time intervals. The carriers are at different evenly-spaced frequencies. The Fast Fourier Transform (FFT) of the carriers at each time interval is taken. The output of each FFT comprises what is known as a symbol and a plurality of these are combined into a COFDM frame. The frames are then transmitted. The distributing of bits of data in frequency and in time gives a system which is very error resistant and can cope with a high degree of multipath distortion.

An OFDM transmitter is described in more detail in European Standard EN 300 744, V1.1.2 (1997-08), Digital Video Broadcasting (DVB); Framing Structure, channel coding and modulation for digital terrestrial television, published by European Telecommunications standards Institute (ETSI), Valbonne, France, August 1997.

A diversity receiver 10 embodying the invention and designed for use with COFDM signals will now be described with reference to FIG. 1 of the drawings. It comprises two antennas (aerials) 20a and 20b connected respectively to tuners 22a and 22b and OFDM demodulation circuits 24a and 24b. Antennas 20a and 20b are spaced apart so that they may employ antenna spatial diversity reception; furthermore each radio frequency tuner is tunable to one of a number of different frequencies for use in frequency diversity reception. The output of each OFDM demodulation circuit 24a, 24b is applied to a respective pre-processor 26a, 26b. Thus the receiver has two radio-frequency 'front ends' providing two signal outputs. The OFDM demodulators provide a confidence level for every sample on every one of the many carriers of the COFDM signal. The outputs of the two pre-processors are applied to a channel-state-qualified soft-decision combiner circuit 32, the output of which is fed to a Viterbi soft-decision decoder 34. Finally the output of the Viterbi decoder 34 is applied to a post-processor 36 which provides the decoded data output at 40. The output of Viterbi decoder is also passed to a diversity control circuit 30, which receives inputs from pre-processors 26a, 26b. The diversity controller 30 uses the information received as its inputs to programme tuners 22a, 22b.

Diversity controller 30 is responsible for dynamically selecting from a number of sources, the two sources which provide the best signals to present to tuners 22a, 22b. Diversity sources could be signals with different frequencies or antennas with different spatial locations, polarisations or radiation patterns.

In the embodiment shown in FIG. 1, antennas 20a and 20b are spaced apart, and tuners 22a and 22b are tunable so that both antenna spatial diversity and frequency diversity may be employed in the same receiver. The receiver operates using antenna spatial diversity, if the diversity controller programmes the tuners 22a, 22b to operate at the same frequency. Frequency diversity however may be employed, if the diversity controller programmes the tuners to operate at different frequencies. Thus the diversity mode of signal reception can be dynamically changed by the diversity controller. In the frequency diversity mode the two antennas are in fact spaced apart but that is not then of any substantial significance.

The way in which spatial and frequency diversity are used together in the preferred embodiment will now be described in more detail.

The system illustrated in FIG. 1 employs two physically separated antennas and two receiver chains, and can therefore employ either frequency diversity or space diversity on the same frequency. The only difference is whether the two tuners are tuned to the same or different frequencies. Suppose frequency diversity is in use, but the receiver decides, using the channel state information (CSI) measures, that one of the frequencies is not contributing much of any use, maybe it is even 'squelched out' already. In that case the squelched receiver could be retained to the single known-to-be working frequency, and, as soon as it synchronises and unsquelches, it will contribute as a working partner in space diversity. If the receiver then detects that things are again getting bad overall (which it may again do using CSI), it tells one of the two (currently space diversity) receivers to go off to another frequency. If it unsquelches on arrival, then frequency diversity is working. If the CSI shows that the new frequency is working much better than the first, then both receivers can be switched to it and space diversity used again. If it is merely comparable the system stays in frequency diversity mode. If the new frequency is even worse than the first, then the system switches back to space diversity on the first frequency. In all this the decoded data stream need never be interrupted, unless neither frequency is any good at all, since one of the receivers will still be receiving a signal while the other is being switched.

Determining which diversity source provides the best signal, and switching between the different diversity sources, is the responsibility of the diversity control circuit. In the preferred embodiment, the diversity controller receives channel state information from the OFDM demodulators, together with indications from the error corrector of the approximate error rate being encountered. For use in frequency diversity reception, it also receives synchronisation flag signals and an indication of whether or not the received signal is intended for reception at the diversity receiver or not. Based on its determination of signal quality, the diversity controller programmes frequencies into the tuners to cause them to operate on either the same frequency, thereby employing spatial diversity, or on different frequencies, to employ frequency diversity.

With a diversity system of the type illustrated in FIG. 1, in each demodulator section every demodulated data bit has its own confidence value and is treated independently by the diversity system, allowing the diversity system always to use the best available signal. Where the signals are COFDM signals, this applies to every demodulated data bit on every one of the carriers.

The detailed operation of the circuit of FIG. 1 is discussed in more detail in our United Kingdom Patent Application 9908675.3 and in European Patent Application 0303231.5, which corresponds to U.S. Ser. No. 09/550,433, titled: Diversity Reception Method and Diversity Receivers used with OFDM Signals. Reference should be made thereto for further details of the construction and operation of the circuit.

Although in the preferred embodiment, the system is configured only to employ spatial and frequency diversity modes of reception, the use of a diversity controller makes it possible for a single receiver to employ any kind of diversity reception. In alternative embodiments, for example, the diversity controller may operate by selecting from a number of different antennas the antennas to which the tuners 22a, 22b are connected, thereby allowing antenna polarisation and/or antenna pattern diversity modes to be also employed.

The use of a diversity controller may allow therefore an adaptive diversity receiver which may operate in one or more different diversity modes in accordance with a plurality of different diversity types, such as frequency diversity, antenna spatial diversity, antenna polarisation diversity and antenna pattern diversity. The receiver is equipped to monitor the quality of the received signals, which may be digital or analogue so far as this feature is concerned, and to respond to the signal quality going below a predetermined level to cause a changes in the diversity mode, that is the type of diversity being used by the receiver. The measure of signal quality can be derived from the confidence values, from the CSI, or from the mean error rate as determined by an error corrector.

The diversity controller has been described as receiving inputs from pre-processors 26a, 26b, and channel state information from each 'front end' from Viterbi decoder 34. It is possible however that the diversity controller may operate by monitoring other indications of source performance, such as signal strength, the Bit-Error-Ratio (BER) after the Viterbi decoder or the pre-Viterbi decoder BER.

The system of FIG. 1 allows for both seamless switching and optimum combination of the input data signals, making them appropriate for a variety of types of diversity. Types of diversity reception will be described next in more detail.

For frequency diversity reception to be employed, the signal will be transmitted on more than one frequency; this sometimes happens in the overlap areas between two transmitters, or as is common practice in short wave (HF) broadcasting. This is done because of the large coverage areas and vagaries of predicting which frequency band will propagate well on a given day. Sometimes multiple frequencies are used in the same band, perhaps partly as a strategy to avoid interference, deliberate or otherwise.

In such a frequency diversity system, two or more signals for the diversity receiver are formed from tuners working at different frequencies. The receiver then simply makes the task of combining these signals together a seamless one, which should result in no disturbance on the decoded output signal. The signals that are broadcast on the two or more frequencies should be suitably constrained. In theory this means that the two signals need to be co-timed, and to be identical except for the broadcast centre frequency. In practice such a constraint is not fully necessary.

Firstly the two signals need only be "closely" timed, so that any variation in timing of the signals received by the diversity receiver is less than the delay that can be inserted by the synchronisation process described above.

Secondly, the signals should be transmitted in such a way that the appropriate re-timing signals can be recovered in the receiver. One way to achieve this is to broadcast all the signals on the different frequencies with the same relationship between the data bits on the one hand, and the OFDM symbol, frame, superframe etc. on the other hand. This is very similar to the process that is required to synchronise OFDM single frequency networks (SFN). A means of achieving this for DVB-T signals is given by the Mega-frame Initialization Packet (MIP) specification: ETSI Technical Standard, Digital Video Broadcasting (DVB); DVB mega-frame for Single Frequency Network (SFN) synchronization; ETSI technical standard TS 101 191 V 1.2.1 (1998-04), European Telecommunications Standards Institute, April 1998.

Thirdly, it is not necessary for any reference information transmitted with the OFDM signal to be identical between the transmissions on different frequencies. For example, in the DVB-T system, reference information is inserted as pilot data cells, namely scattered, continual and transmission parameter signalling (TPS) pilots, and these need not be identical, since the demodulators remove this reference information before producing the soft decisions. For example, the reserved TPS bats could be used differently on different frequencies without adverse affect on the diversity system. This principle can be extended further, so that 2K modulation can be used on one frequency and 8K on another, provided that a means of synchronisation is left open to the receiver.

In any event, the same data should be coded through the same convolutional coder, or identical convolutional coders, before being conveyed by diverse routes to the receivers.

Figure 2:
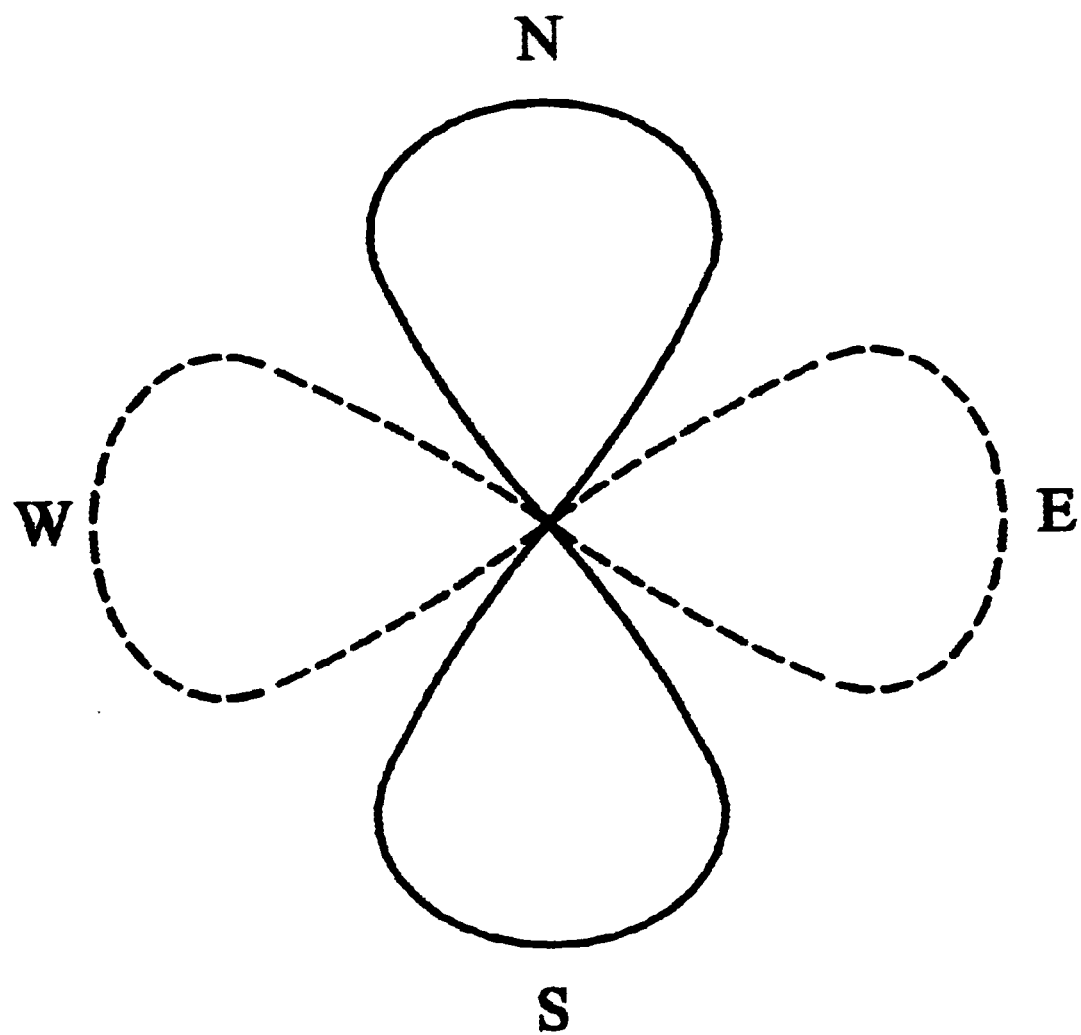
FIG. 2 illustrates an approximate antenna pattern of a pair of crossed dipoles which can be used with a receiver embodying the invention to provide an automatic rotator function.

Antenna pattern diversity is illustrated in FIG. 2. Consider the simple example of a pair of crossed dipoles. Each has a figure-of-eight antenna pattern, as shown in FIG. 2 by solid and dotted lines, respectively. If these two antennas are connected to the two inputs of a diversity receiver embodying the invention, the receiver will automatically select the most appropriate combination of receivers (i.e. dipoles) to use.

If for example a signal is being received mainly from the East or West directions, the dotted line antenna will be favoured. Conversely, for the North or South directions the solid line antenna will be favoured. Equally, a combination of the two can be used for intermediate directions. In effect an automatic rotator has been formed.

For a conventional maximal-ratio diversity system using antennas as illustrated in FIG. 2, a weighted sum of the signals to the two antennas would be used, with the weighting factor depending on the appropriate signal-to-noise ratio. As mentioned above, this requires the formation of a relatively long-term average value for the weighting factors. With the diversity system now proposed, every demodulated data bit is treated independently by the diversity system, allowing extremely rapid movement from one antenna to the next.

As noted above, strictly speaking, if the signal paths are such that only one of the antennas is capable of receiving a signal at any one time, then this is not a diversity system, but a system with extended coverage capabilities. In practice, with the example above, it is likely that local reflections will always ensure that both antennas receive some signals.

This antenna pattern diversity technique could be extended to a system with more antennas, where each would have it significant gain, increasing the signal level into each antenna, and therefore further improving the reception capabilities of the overall system.

It can be seen that the diversity systems described and illustrated can be used in many mobile data transmission applications, including DVB-T, DAB, DRM (Digital Radio Mondiale) and systems such as radio cameras. The technique does not depend specifically upon the OFDM signal; it can be applied to other digital signals (e.g. single carrier systems). However it is believed that the greatest benefit will be obtained when used in conjunction with the OFDM transmission system.

Particularly when implemented in the frequency diversity mode described above, the diversity technique described using soft-decision decoding can have application in facilitating hand-over in multi-frequency networks, such as used for mobile telephones. That is, as a receiver moves through such a network, there is a need for the receiver to re-tune to new transmitters, desirably in a seamless way. The present system can provide the means to achieve this, thereby effectively improving the coverage in the overlap area between transmitters.

A DVB-T implementation of the system can be made using the already available LSI Logic demodulator chips L64760 and L64724 manufactured by LSI Logic Corporation, 1551 McCarthy Boulevard, Milpitas, Calif. 95035, USA. The L64780 is the DVB-T demodulator and produces soft-decision data at its output. The L64724 is used as the Viterbi and Reed-Solomon error correctors (although in practice it is a full satellite demodulator chip). The added components for the diversity system can be positioned at the interface between these two chips. The L64780 also produces signals to synchronise the diversity system and implement the squelch described above.

Thus in summary, a system has been described which allows diversity reception of two or more signals which carry the same data signal, but which suffer different transmission channel impairments. The system allows seamless combination of the two signals in a way that allows for the optimum data output to be produced. The technique applies equally for (a) antenna spatial diversity, (b) antenna polarisation or (c) pattern diversity, or (d) frequency diversity, allowing possible applications in many data transmission applications including DVB-T, DAB and DRM. In an alternative arrangement, the technique can be applied to switch between any two or more of (a) antenna spatial diversity, (b) antenna polarisation or pattern diversity, or (c) frequency diversity.

What is claimed is:

1. A diversity receiver for receiving signals transmitted at radio frequency, the diversity receiver being adapted to operate in different diversity modes in accordance with a plurality of different diversity types comprising at least two of:

(a) antenna spatial diversity;

(b) antenna polarisation diversity;

(c) antenna pattern diversity; or (d) frequency diversity; the receiver including:

at least two tuner and digital demodulator circuits coupled simultaneously to receive received signals, each tuner and digital demodulator circuit providing a succession of output values representative of the values of the received signals, monitoring means for monitoring the quality of the output values respectively from each of the tuner and digital demodulator circuits responsive to the received signals, and control means coupled to the monitoring means and responsive to the signal quality being below a predetermined level to command a change in the diversity mode of operation of the receiver.

2. A diversity receiver according to claim 1, wherein each tuner and digital demodulator circuit provides a succession of confidence values representing a measure of the confidence with which the received signals represent each of those output values.

3. A diversity receiver according to claim 1, wherein the combining means forms a weighted sum of the output values from the monitoring means derived respectively from the two tuner and digital demodulator circuits.

4. A diversity receiver according to claim 1, further comprising a Viterbi decoder coupled to the output of the combining means.

5. A diversity receiver according to claim 1, wherein the received signals are OFDM signals.

6. A diversity receiver for receiving signals transmitted at radio frequency, the diversity receiver being adapted to operate in different diversity modes in accordance with a plurality of different diversity types comprising at least two of:

(a) antenna spatial diversity;

(b) antenna polarisation diversity or antenna pattern diversity; or (c) frequency diversity; the receiver including:

at least two tuner and digital demodulator circuits coupled simultaneously to receive received signals, each tuner and digital demodulator circuit providing a succession of output values representative of the values of the received signals, monitoring means for monitoring the quality of the output values respectively from each of the tuner and digital demodulator circuits responsive to the received signals, and control means coupled to the monitoring means and responsive to the signal quality being below a predetermined level to command a change in the diversity mode of operation of the receiver.

7. A diversity receiver according to claim 6, wherein each tuner and digital demodulator circuit provides a succession of confidence values representing a measure of the confidence with which the received signals represent each of those output values.

8. A diversity receiver according to claim 6, wherein the combining means forms a weighted sum of the output values from the monitoring means derived respectively from the two tuner and digital demodulator circuits.

9. A diversity receiver according to claim 6, further comprising a Viterbi decoder coupled to the output of the combining means.

10. A diversity receiver according to claim 6, wherein the received signals are OFDM signals.

\* \* \* \* \*

UNITED STATES PATENT AND TRADEMARK OFFICE
CERTIFICATE OF CORRECTION

PATENT NO. : 6,792,258 B1
DATED : September 14, 2004
INVENTOR(S) : Christopher Ryan Nokes et al.

It is certified that error appears in the above-identified patent and that said Letters Patent is hereby corrected as shown below:

<u>Column 6, line 66 through Column 7, line 2,</u>
Should read:
3. A diversity receiver according to claim 1, further comprising combining means for forming a weighted sum of the output values form the monitoring means derived respectively from the two tuner and digital demodulator circuits.

<u>Column 8,</u>
Lines 12-15, should read:
8. A diversity receiver according to claim 6, further comprising combining means for forming a weighted sum of the output values from the monitoring means derived respectively from the two tuner and digital demodulator circuits.

Signed and Sealed this

Twenty-first Day of June, 2005

JON W. DUDAS
*Director of the United States Patent and Trademark Office*